May 2, 1961
D. R. CARLISLE ET AL
2,982,099
FUEL INJECTION ARRANGEMENT IN COMBUSTION
EQUIPMENT FOR GAS TURBINE ENGINES
Filed Oct. 4, 1957
3 Sheets-Sheet 1
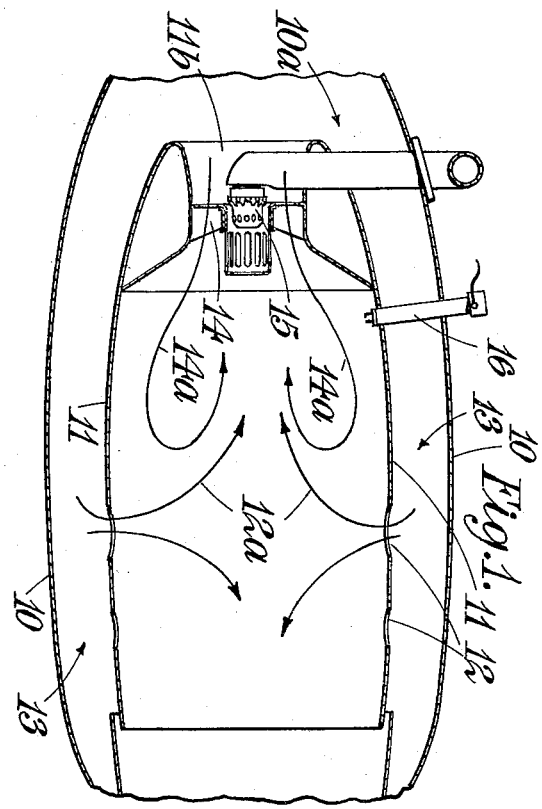
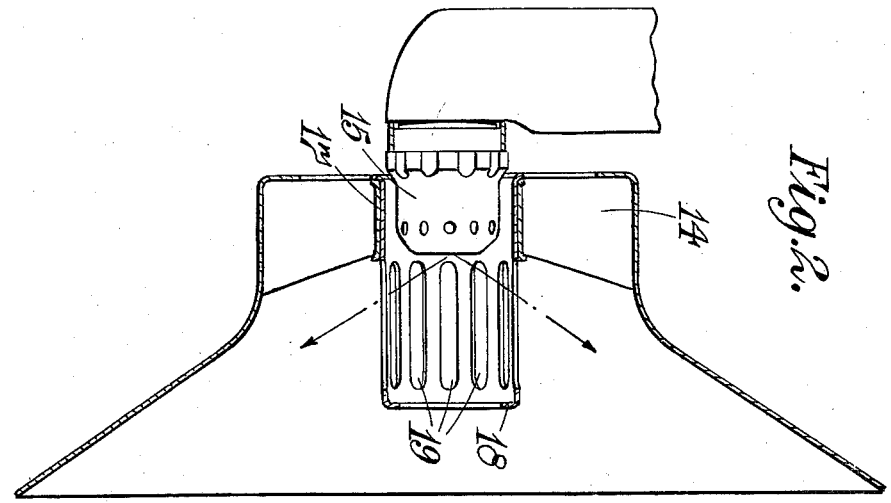

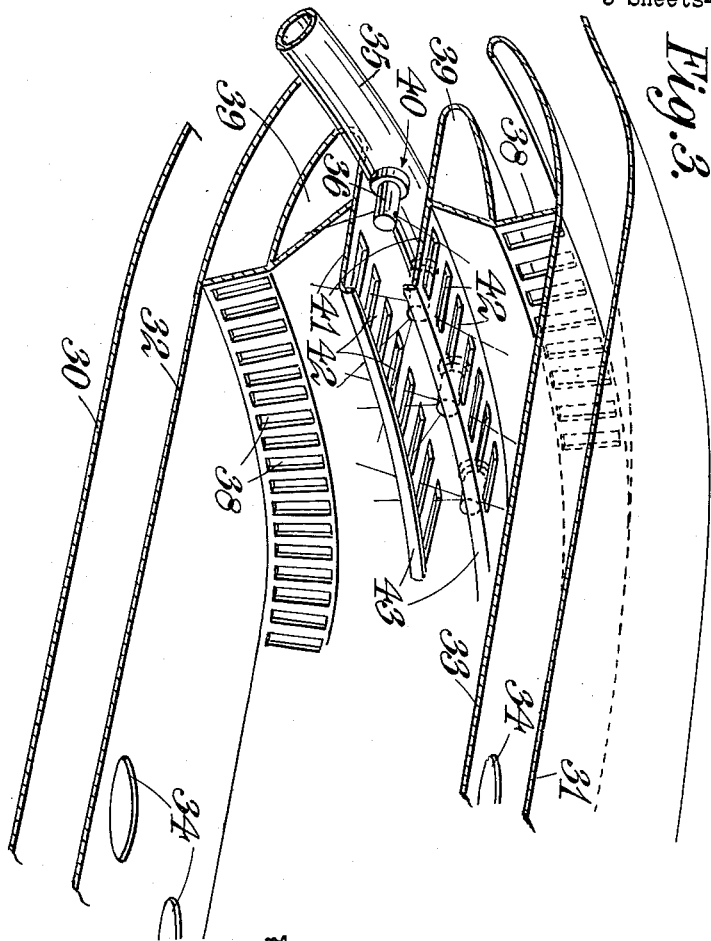
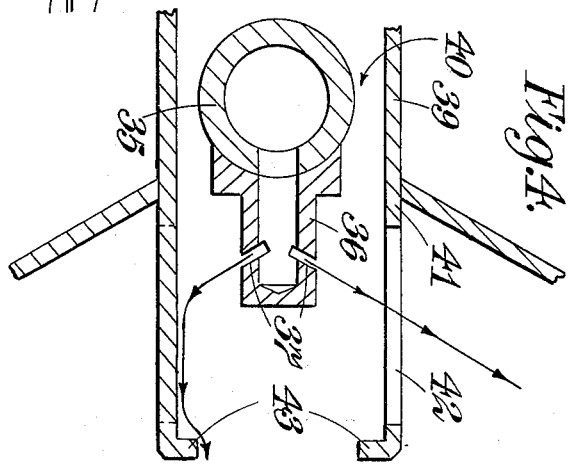

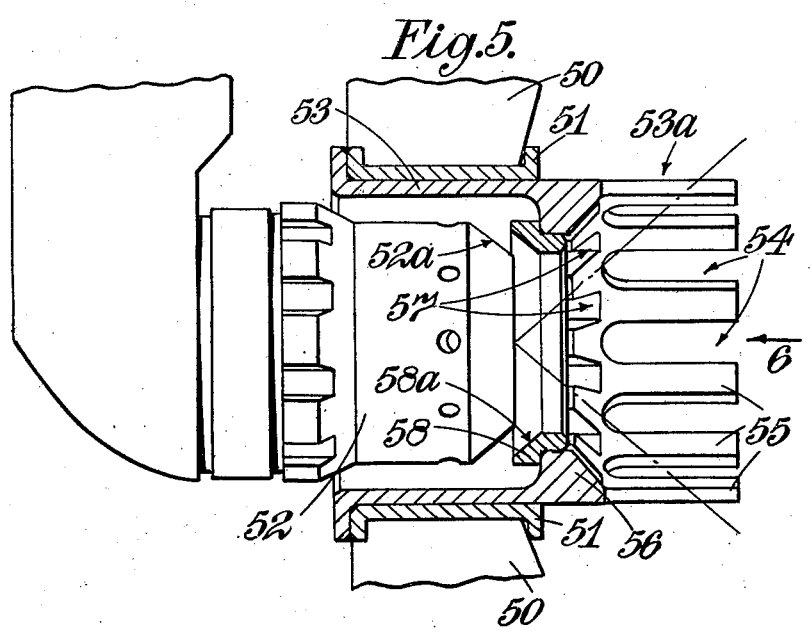
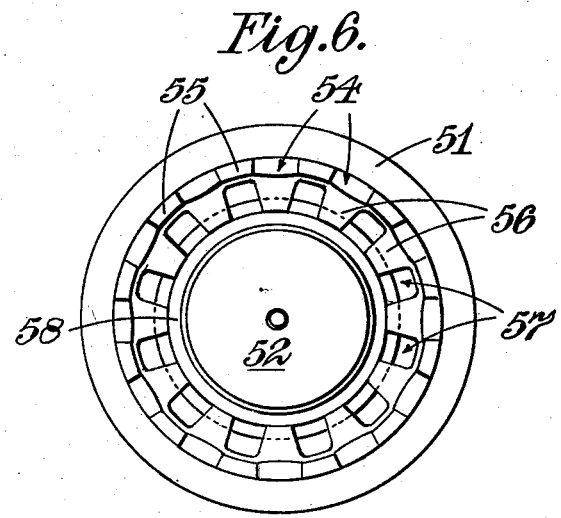

2,982,099

FUEL INJECTION ARRANGEMENT IN COMBUSTION EQUIPMENT FOR GAS TURBINE ENGINES

Denis Richard Carlisle, Risley, and Ernest Milner, Allestree, England, assignors to Rolls-Royce Limited, Derby, England, a British company Filed Oct. 4, 1957, Ser. No. 688,814

Claims priority, application Great Britain Oct. 9, 1956

7 Claims. (Cl. 60—39.74)

This invention comprises improvements in or relating to combustion equipment of the type, such as is employed in gas-turbine engines, comprising an air casing and, within the air casing, a "flame tube" defining the actual combustion space. Such combustion equipment will be hereinafter called "combustion equipment of the kind referred to."

In some constructions of such combustion equipment the flame tube is a tubular structure accommodated in an individual tubular air casing, in other constructions a plurality of such flame tubes are disposed in an annular space afforded between inner and outer coaxial walls forming the air casing, and in yet other constructions both the air casing and "flame tube" are of annular form.

In such combustion equipment, the air enters the air casing at one end; part of the air (usually termed the primary air) flows substantially directly into the flame tube at its upstream end where fuel is injected into it and the remainder of the air (usually termed the secondary air) flows outside the flame tube and enters it through ports provided intermediate the ends of the flame tube. A proportion of the secondary air flows from these ports towards the upstream end of the flame tube. This proportion of the air and the air entering through the inlet end of the flame tube constitutes the air supply to the primary combustion zone wherein the burning of the fuel is substantially completed.

We have now found that the initiation of combustion in the primary zone depends to a marked extent upon the uniform distribution of the fuel throughout the air in the primary zone so that the fuel/air ratio is close to the stoichiometric ratio.

This invention has for an object to provide means for improving the distribution of fuel in the primary combustion zone of the combustion equipment.

According to the present invention, combustion equipment of the kind referred to has fuel injection means located at the inlet end of the flame tube and adapted to produce a conical spray of fuel, and is provided with cowling means around and spaced away from the fuel injection means, which cowling means affords a substantially straight through passage for part of the primary air and has a portion extending beyond the fuel injection means through the conical fuel spray into the primary combustion zone, this portion of the cowling means being provided with circumferentally-spaced apertures so that part of the fuel spray passes uninterruptedly through the apertures and the remainder is intercepted and carried to the downstream end of the cowling means by air flowing in the passage.

In this way the fuel is more uniformly distributed in the primary combustion zone, and by varying the size of the apertures, the ratio of the quantity of fuel passing out through the apertures to the quantity of fuel intercepted and carried to the downstream end of the cowling means is varied.

In one preferred arrangement, the portion of the cowling means extending through the conical fuel spray is provided at its downstream and with an inturned lip which reduces the momentum of the air flowing along the inner surface thereof and assists in the atomisation of the fuel carried to the downstream end.

In another preferred arrangement, the apertures are in the form of axial slots which extend from the downstream end of the portion of the cowling extending through the fuel spray, and which form a number of fuel intercepting fingers.

Three embodiments of combustion equipment according to this invention will now be described with reference to the accompanying drawings, in which—

Figure 1 shows diagrammatically combustion equipment having a tubular flame tube, Figure 2 shows the inlet end of the flame tube to a larger scale, Figure 3 is a perspective view of combustion equipment having an annular flame tube, Figure 4 is a section through a fuel injector as used in the construction of Figure 3, Figure 5 is an axial section through a further embodiment of the invention, and Figure 6 is a view in the direction of arrow 6 on Figure 5.

Referring first to Figures 1 and 2, the combustion equipment comprises an air casing 10 which may be either of the tubular kind or of the annular kind, and a flame tube 11 of the tubular kind. When the air casing is tubular, it accommodates a single flame tube, and when the air casing is annular, it accommodates a series of flame tubes in an annular assembly.

The combustion equipment receives compressed air at its inlet end 10a for instance from the compressor of a gas-turbine engine, and the air flows partly into the flame tube through its inlet end 11b and partly into the space 13 between the flame tube and air casing to enter the flame tube through ports 12 in its walls.

The air passing through the inlet 11a constitutes the primary air. This air enters the primary combustion zone through a series of swirl vanes 14 surrounding a fuel injector 15 and travels approximately in a path as indicated by arrows 14a. A proportion of the air flowing through the ports 12 flow towards the upstream end of the flame tube into the primary combustion zone, as indicated by arrows 12a, the remainder mixing with the combustion products in the downstream portion of the flame tube.

The fuel injector 15 is usually of the swirl type and produces a conical spray of fuel and it will thus be appreciated that there is a tendency for the proportion of air in the primary combustion zone from the ports 12 to be starved of fuel, and the remainder of the air in the primary zone will receive an excess of fuel. Thus if the quantity of fuel injected is calculated to be in the stoichiometric ratio to the total quantity of air in the primary zone, which is desirable for good ignition and flame propagation, then although the fuel in the region of the igniter device 16 will be ignited, good flame propagation will not be obtained due to the fuel/air mixture being over-rich in parts and weak in parts.

There is therefore provided according to the present invention means, for example as shown in Figure 2, to produce a more even distribution of the fuel in the primary combustion zone.

A cylindrical cowling 17 is provided centrally of the swirl vanes to encircle the fuel injector 15 at its upstream end and to project beyond the fuel injector into the primary combustion zone. The cowling is open at each end so that part of the primary air flows straight through it into the primary combustion zone, and is provided at its downstream end with a narrow inturned lip 18. The cowling 17 is also provided over its downstream portion with a ring of axial slots 19.

Thus in operation, the conical spray 20 of fuel from the fuel injector 15 in part passes freely through the apertures 19 and in part is intercepted by the cowling between the apertures 19 and this latter part of the fuel flows along the inner surface of the cowling and is carried by the air flowing through the cowling over the lip 18 into the central part of the primary combustion zone. By suitably selecting the size of the apertures 19 a more nearly stoichiometric distribution of fuel, and thus better flame propagation, can be obtained in the primary combustion zone.

Referring now to Figures 3 and 4, there is illustrated fully annular combustion equipment. The air casing comprises inner and outer annular walls 30, 31 and the flame tube has inner and outer coaxial walls 32, 33 with secondary air inlet ports 34. The fuel injection means comprises a ring manifold 35 with a series of nozzles 36 having split orifices 37 for producing flat inwardly and outwardly directed sprays, the sprays from the nozzles together forming a pair of substantially conical sprays, one directed towards wall 32 and the other towards wall 33.

The primary air enters the flame tube partly through slotted walls 38 projecting from the walls 32, 33 and partly in a substantially straight path through an annular air passage 40 between coaxial ring structures 39 between which the fuel manifold 35 is arranged.

In order to improve the fuel distribution, cowling means is supported by the ring structures 39 to project into the primary combustion zone beyond the fuel nozzles 36. The cowling means comprises axial extensions 41 of the annular walls of the structure 39 which bound the passage 40, the extensions having a ring of axially-extending slots 42 and narrow lips 43 at their downstream ends. The operation is as described with reference to Figures 1 and 2.

In the construction shown in Figures 5 and 6, swirl vanes 50 of the flame tube are connected at their ends by a shroud 51, and a swirl type fuel injector 52 has its end projecting within the shroud 51 in spaced relation thereto. In order to improve fuel distribution within the primary zone, there is provided a cowl in the form of sleeve 53 fitted within the shroud 51, the sleeve having a portion 53a projecting into the primary combustion zone, the portion 53a having axial slots 54 extending in it from its downstream end to leave a number of fuel intercepting fingers 55.

The sleeve 53 has internally a series of circumferentially-spaced inward projections 56, the space 57 between which permit a substantially straight-through flow of air through sleeve 53 into the portion 53a. The projections carry a ring 58 which is axially-spaced from the tip of the nozzle 52 and has its upstream face 58a chamfered to correspond to the chamfered periphery 52a of the nozzle tip; thus part of the primary air flowing into the sleeve 53 passes between the ring 58 and the nozzle tip and then through the ring and sleeve portion 53a into the primary combustion zone. The ring 58 ensures an even distribution of the air passing through the spaces 57 and produces a blast of air over the nozzle tip so preventing carbon formation.

The operation of this construction is similar to that of the construction of Figures 1 and 2, but in addition the construction may in some combustion equipment also show advantage in avoidance of carbon formation.

We claim
1. Combustion apparatus for a gas turbine engine comprising an air casing, a flame tube accommodated within the air casing in spaced relation thereto, said flame tube defining within it the combustion space and having an air inlet at one end and an outlet for combustion products at its other end, fuel injection means mounted adjacent said air inlet and adapted to inject a conical fuel spray towards the combustion space, and cowling means disposed around the fuel injection means in spaced relation thereto, the cowling means having a substantially straight through passage for part of the air entering the combustion space through the air inlet and having a portion extending downstream beyond the fuel injection means and through and beyond the conical fuel spray into the combustion space, said portion of the cowling means being open at its downstream end and having in it circumferentially-spaced apertures so that part of the fuel spray passes uninterruptedly through the apertures and the remainder is intercepted and carried to the downstream end of the cowling means by air flowing in the passage.

2. Combustion equipment as claimed in claim 1, wherein the portion of the cowling means extending through the conical fuel spray is provided at its downstream end with an inturned lip which reduces the momentum of the air flowing along the inner surface thereof and assists in the atomisation of the fuel carried to the downstream end.

3. Combustion equipment as claimed in claim 1, wherein the apertures are in the form of axial slots which extend from the downstream end of the portion of the cowling extending through the fuel spray, and which form a number of fuel intercepting fingers.

4. Combustion equipment according to claim 1, said flame tube being of the tubular kind, wherein the fuel injection means projects axially in the air inlet of the flame tube and the cowling is a cylindrical member supported from the flame tube at the center of a ring of swirl vanes, the apertured portion of the cowling projecting downstream from the swirl vanes.

5. Combustion equipment according to claim 4, wherein the apertures are closed-ended axial slots and the cylindrical member has an inturned lip at its downstream end.

6. Combustion equipment according to claim 4, wherein the apertures are slots extending from the downstream end of the apertured portion to leave a plurality of axial fuel-intercepting fingers.

7. Combustion equipment according to claim 1, said flame tube being of the annular kind, wherein the fuel injection means comprises a series of circumferentially-spaced fuel nozzles, each producing flat inwardly and outwardly directed sprays, and the cowling comprises annular walls defining an annular primary air passage accommodating the fuel nozzles and apertured axial extensions of the walls projecting into the primary combustion zone.

References Cited in the file of this patent

UNITED STATES PATENTS

| 1,322,999 | Bester | Nov. 25, 1919 |
| 2,554,401 | Christensen | May 22, 1951 |
| 2,632,299 | Loughran | Mar. 24, 1953 |
| 2,787,319 | Ryder | Apr. 2, 1957 |
| 2,827,759 | Bruckmann | Mar. 25, 1958 |
| 2,850,875 | Gahwyler | Sept. 9, 1958 |

FOREIGN PATENTS

| 201,618 | Australia | Apr. 20, 1956 |